United States Patent [19]
Casilli

[11] Patent Number: 4,556,087
[45] Date of Patent: Dec. 3, 1985

[54] PULSATION DAMPER
[75] Inventor: Joseph C. Casilli, Waldwick, N.J.
[73] Assignee: ITT Corporation, New York, N.Y.
[21] Appl. No.: 684,226
[22] Filed: Dec. 20, 1984
[51] Int. Cl.⁴ .............................................. F16L 55/04
[52] U.S. Cl. ......................................................... 138/30
[58] Field of Search ...................... 92/41, 43, 110, 111; 137/568, 593; 138/30, 31; 220/85 B; 417/540

[56] References Cited
U.S. PATENT DOCUMENTS
3,741,692 6/1973 Rupp .................................... 417/540

Primary Examiner—Stephen Marcus
Assistant Examiner—Mark Thronson
Attorney, Agent, or Firm—John T. O'Halloran; Peter R. Ruzek

[57] ABSTRACT

A pulsation damper includes a housing which bounds an internal space and two substantially coaxial openings at opposite axial ends thereof. A movable wall sealingly subdivides the internal space of the housing into a fluid-containing compartment which is supplied with the fluid whose pulsations are to be damped through one of the openings, and a gas-containing compartment which communicates with the other opening. An actuating rod is connected to the movable wall for joint movement therewith and has an extension portion which extends into the other opening and has an annular recess and forms a sealed interface with the surface bounding the other opening. Two annular channels open onto such surface at axial spacings from the recess in an equilibrium position of the movable wall. The channel that is closer to the gas-containing compartment communicates with a discharge conduit, while the other channel is permanently supplied with pressurized gaseous medium, so that when the movable wall is axially displaced out of the equilibrium position by more than a predetermined distance away from and toward the other opening, communication is established between the recess and the respective channel and the pressure in the gas-containing compartment is respectively increased and relieved through a conduit system that extends in the actuating rod between the gas-containing compartment and the recess. The channels are provided in respective inserts sealingly received in enlarged passage portions of the housing.

10 Claims, 3 Drawing Figures

PULSATION DAMPER

BACKGROUND OF THE INVENTION

The present invention relates to pulsation dampers in general, and especially to a pulsation damper particularly suited for use in a conduit connected to the output of a pump.

It is well known that pressure variations or pulses may occur in a fluid medium being conveyed through pipes or similar conduits, such as discharge conduits connected to and/or communicating with the output ports of reciprocating-type pumps. However, in many cases, it is desired that the fluid be delivered to its ultimate destination at a substantially unvarying pressure at least over the short run, that is, without short-duration pressure excursions, while long-term gradual pressure changes may be acceptable and even desired in some instances.

This situation has already been recognized and attempts have been made to develop pulsation dampers which would damp or suppress the undesired pressure pulses. So, for instance, there are known pulsation dampers containing a constant quantity of enclosed gaseous medium which may be separated from the fluid being conveyed by a movable wall or member which is displaced by the difference between the pressure of the fluid being conveyed and that of the enclosed gaseous medium until equilibrium is achieved. While the pulsation dampers of this type are quite acceptable for many applications, experience has shown that they can work to complete satisfaction only within a rather limited pressure range around the pressure for which they have been originally designed or adjusted, especially if a flexible diaphragm or a bellows is used as the movable wall or member, since otherwise the movable member is subjected to excessive deviations from its original position and thus excessive deformations in the case of use of a flexible diaphragm or bellows as the movable member, with attendant changes in response of the movable member to further pressure changes of the same type as that which has resulted in the excessive displacement or deformation to begin with.

To avoid this disadvantage, it has been proposed in the U.S. Pat. No. 3,741,692, issued June 26, 1973, so to construct the pulsation damper to be used in a discharge conduit from a reciprocatory-type pump and operating on the flexible diaphragm principle as to be able to change the pressure of the enclosed gaseous medium by changing the quantity of such enclosed gaseous medium in dependence on the direction and/or extent of displacement of the movable wall incorporating the flexible diaphragm from its originally selected position. This is achieved by using two separate valves, that is, an inlet valve interposed in a path between a pressurized gaseous medium source and the space containing the enclosed gaseous medium, and an outlet valve arranged in a relief path between such space and the ambient atmosphere. There is further provided an actuating arrangement which is movable in dependence on the movement of the movable wall and thus on the magnitude and direction of the pressure differential between the enclosed gaseous medium and the fluid being conveyed and which opens the inlet valve to admit an additional quantity of the pressurized medium into the aforementioned space when the movable wall is excessively displaced in the direction corresponding to the excess of the pressure of the fluid being conveyed over that of the gaseous medium, or the outlet valve to discharge a quantity of the gaseous medium from such space when the movable wall is excessively displaced in the direction corresponding to the excess of the pressure of the gaseous medium over that of the fluid being conveyed. In this manner, the average pressure of the gaseous medium tracks the average pressure of the fluid being conveyed and the movable wall is moved in a limited range around its desired position irrespective of the absolute values of such average pressures. However, this arrangement is rather complicated, especially because of the provision of the separate inlet and outlet valves and the actuating arrangement therefor which is separate from the movable valve members of such valves, and hence rather expensive. Moreover, because of the separateness of such components, this prior-art arrangement has a high degree of exposure to malfunction since failure of any of the valves to follow the movement of the actuating arrangement when such movement is called for will render the entire pulsation damper inoperative for the desired purpose even though the actuating arrangement and the respectively other valve are still capable of operating properly.

SUMMARY OF THE INVENTION

Accordingly, it is a general object of the present invention to avoid the disadvantages of the prior art.

More particularly, it is an object of the present invention to provide a pulsation damper which does not possess the disadvantages of the known pulsation dampers.

Still another object of the present invention is so to construct the pulsation damper of the type here under consideration as to be especially suited for use in discharge lines from reciprocatory-type pumps where the discharge pressure may vary significantly over a short range in the form of pressure pulses, and also over the long range in the form of a gradual or even relatively abrupt increase or decrease in the average pressure of the fluid being conveyed.

It is yet another object of the present invention to develop a pulsation damper of the above type in such a manner that the possibility of failure thereof is kept to a minimum.

A concomitant object of the present invention is so to design the pulsation damper as to be relatively simple in construction, inexpensive to manufacture, easy to use and maintain, and reliable in operation nevertheless.

In pursuance of these objects and others which will become apparent hereafter, one feature of the present invention resides in a pulsation damper for damping pulsations in a fluid, comprising a housing centered on an axis, having two axially spaced ends and an inner surface which bounds an internal chamber and two substantially coaxial openings at the respective axially spaced ends of the housing; a movable wall extending across the internal chamber and sealingly subdividing the same into a fluid-containing compartment which has the fluid admitted thereinto through one of the openings during the use of the pulsation damper, and a gas-containing compartment that is in communication with the other of the openings, the wall being movable in either one of the axial directions out of a predetermined equilibrium position in response to pressure differential between the compartments; means for admitting a pressurized gaseous medium into a first region of the other opening which is more remote from the gas-containing compartment; discharging means for communicating a second region of the other opening that is closer to the gas-containing compartment with the ambient atmosphere; and an actuating rod connected to the movable wall for joint movement therewith and having an extension portion which passes from the gas-containing compartment into the other opening and has an outer surface which forms respective interfaces with the inner surface in the other opening outside the regions, the actuating rod having internal conduit means which constantly communicates with the gas-containing compartment and opens onto a zone of the outer surface that is situated between and out of communication with either one of the admitting and discharging means in the equilibrium position of the movable wall and becomes at least partially aligned respectively with the admitting means and with the discharging means when excessive pressure in the fluid-containing compartment and in the gas-containing compartment respectively has moved the movable wall and the actuating rod out of the equilibrium position respectively toward and away from the other opening, respectively to increase and decrease the pressure of the gaseous medium in the gas-containing compartment to cause the movable wall to move toward the equilibrium position.

A particular advantage of this construction is that, since the actuating rod serves simultaneously for transmitting the force differential acting on the movable wall to the extension portion thereof, for constituting the movable valve member of the valve arrangement for controlling the admission of the gaseous medium into and its discharge from the gas-containing compartment, and for establishing communication, via the conduit means provided therein, between the gas-containing compartment and the respective admitting and discharging ports of the valve arrangement, it is assured that no malfunction short of total breakdown of the pulsation damper will interfere with the proper function of the pulsation damper. Therefore, the operation of the pulsation damper will be reliable and totally predictable since there is a direct mechanical connection between the parts which, on the one hand, react to and, on the other hand, control the pressure differential between, the fluid-containing and gas-containing compartments.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
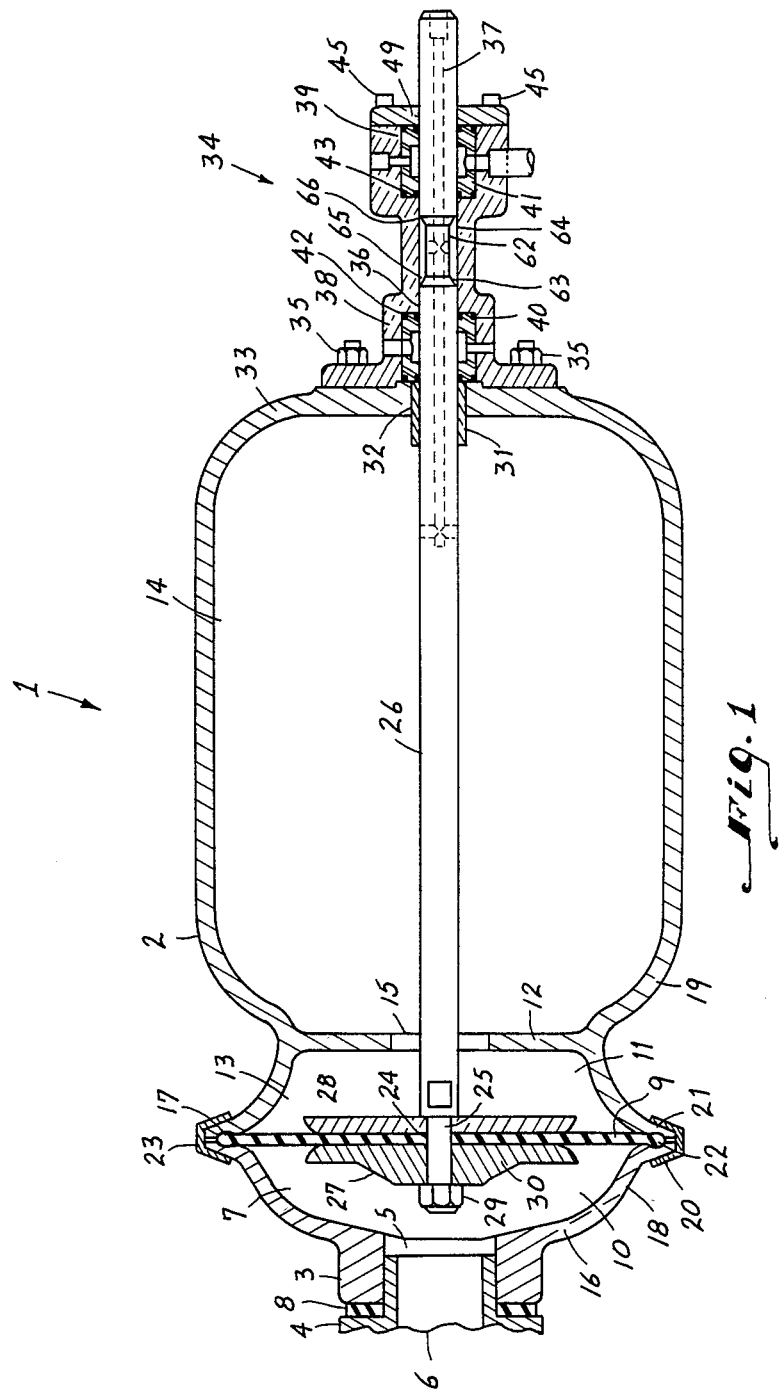
FIG. 1 is a longitudinal sectional view of a pulsation damper according to the present invention in an equilibrium position thereof.
Figure 2:
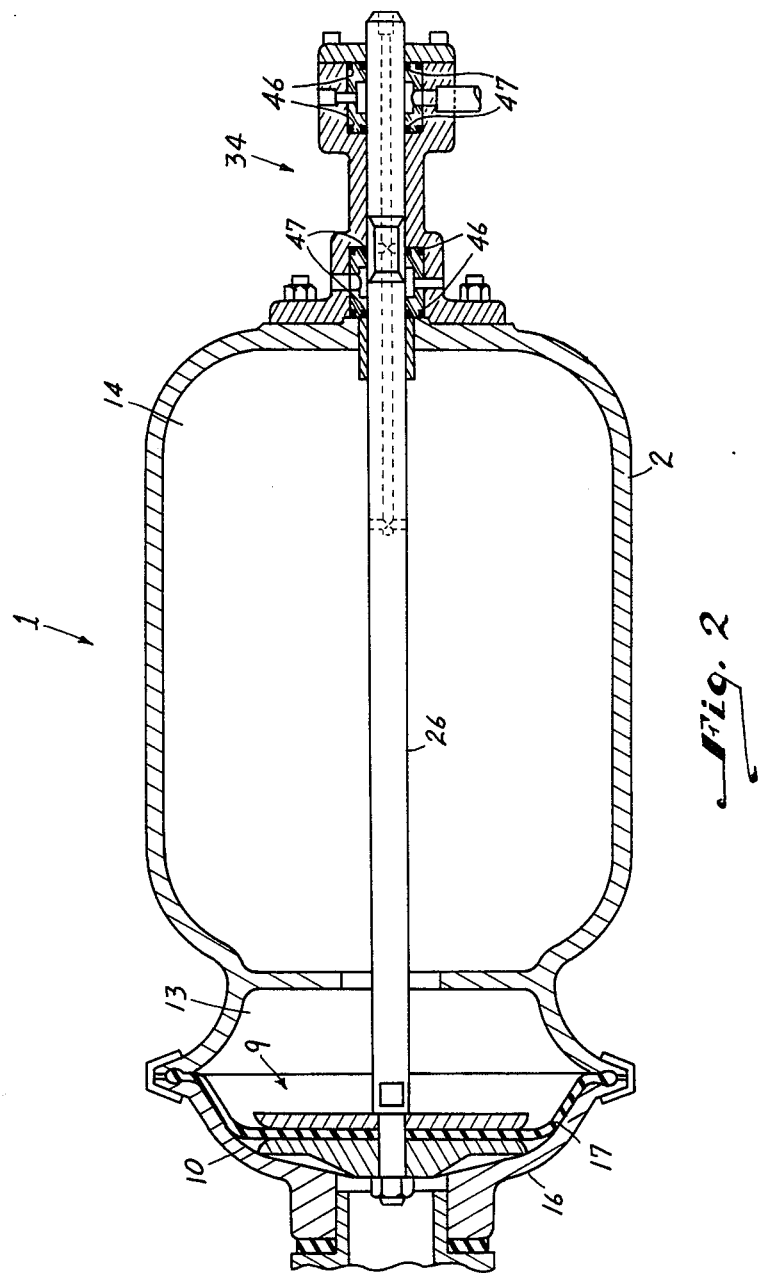
FIG. 2 is a view similar to that of FIG. 1 but in a first axially displaced position.
Figure 3:
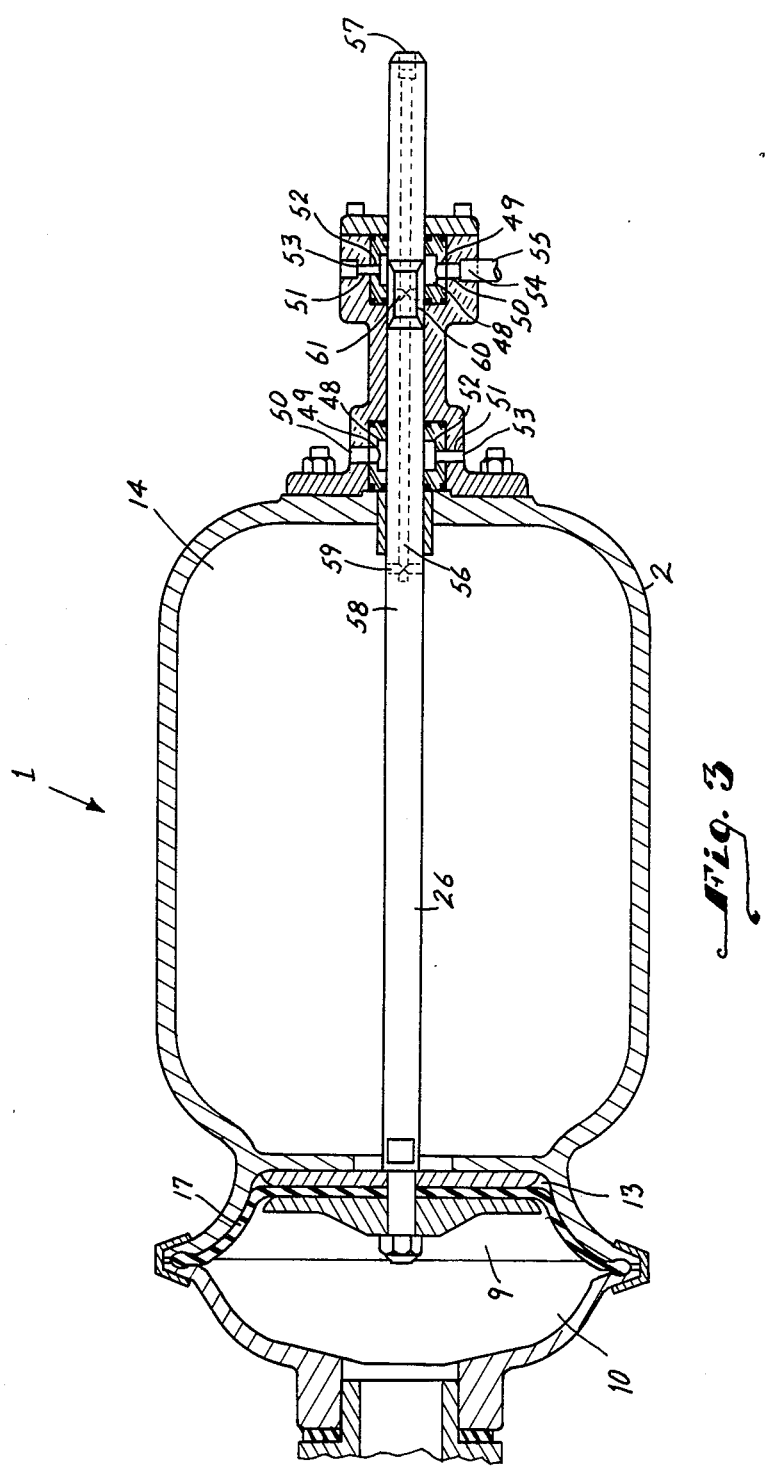
FIG. 3 is another view similar to that of FIG. 1 but in a second axially displaced position.

Referring now jointly to FIGS. 1 to 3 of the drawing in detail, it may be seen that the reference numeral 1 has been used therein to identify a pulsation damper constructed in accordance with the present invention, in its entirety. The pulsation damper 1 of the present invention is especially suited for use in reducing the pulsating discharge of reciprocating pumps, especially air-operated diaphragm pumps, but it can also be advantageously used in other applications. The pulsation damper 1 includes a housing 2 which has a connecting portion or nipple 3 by means of which the housing 2 is connected to a pipe or similar conduit or structure that is diagrammatically and only fragmentarily illustrated at 4. The nipple 3 bounds an inlet opening 5 which is shown to be internally threaded for threading an externally threaded portion of the structure 4 thereinto and which communicates with a central passage 6 of the structure 4 to admit a fluid, especially a liquid, the pulsations of which are to be suppressed or damped, from the passage 6 into the inlet opening 5 and from there into an internal chamber 7 bounded by the housing 2.

A movable wall 9 sealingly subdivides the internal chamber 7 into a first compartment 10 which contains the fluid, especially liquid, whose pulsations are to be suppressed and hence will also be referred to as a fluid-containing compartment, and a second compartment 11 which contains a compressible gaseous medium, such as air, usually at a superatmospheric pressure and which will, therefore, be occasionally called a gas-containing compartment. The gas-containing compartment 11 is subdivided by a partitioning wall 12 into a first zone 13 situated at the same side of the partitioning wall 12 as the movable wall 9, and a second or accumulator zone 14 arranged at the opposite side of the partitioning wall 12, the volume of the accumulator zone 14 by far exceeding the combined volume of the fluid-containing compartment 10 and the first zone 13. The zones 13 and 14 are in relatively unobstructed communication with one another via a substantially centrally located aperture 15 of the partitioning wall 12. As will become apparent hereafter, the main if not only function of the partitioning wall 12 is to serve as an abutment for delimiting the extent of movement of the movable wall 9 in the rightward direction as considered in the drawing. Similarly, a region 16 of the housing 2 which surrounds the nipple 3 serves as an abutment for delimiting the extent of movement of the movable wall 9 in the opposite or leftward direction as considered in the drawing. However, it will be appreciated that the position of the pulsation damper 1 as depicted in the drawing is not necessarily coincident with that which the pulsation damper 1 assumes when in use. So, for instance, the pulsation damper 1 could extend substantially vertically upwardly from the structure 4 in use. Nevertheless, for the sake of convenience, references will be had in this description to the directions corresponding to the orientation of the pulsation damper 1 as shown in the drawing, without specifically referring to such orientation.

The movable wall 9 includes, as one of its main components, a flexible diaphragm 17 which is sealingly connected at its outer periphery to the housing 2. To this end, the housing 2 is constituted by two separate parts 18 and 19, of which the housing part 18 carries the nipple 3 and partially delimits the fluid-containing compartment 10, and the housing part 19 partially delimits the first zone 13 of the gas-containing compartment 11 and completely bounds the second zone 14 of this compartment 11. The housing parts 18 and 19 have respective substantially radially outwardly extending, substantially coextensive, flanges 20 and 21 which confine a peripheral portion 22 of the flexible diaphragm 17 between themselves. The peripheral portion 22 has a substantially bead-like cross section, and the flanges 20 and 21 are provided with correspondingly configured circumferentially extending grooves which partially receive the bulging peripheral portion 22 of the diaphragm 17 and thus hold the same against displacement in the radially inward direction. The flanges 20 and 21 are connected to one another by means of a clamping ring or arrangement 23 which is of a conventional construction and hence will not be described here in any great detail. Suffice it to say that the clamping arrangement 23 may be constructed as a split ring which is widened in the radially outward direction thereof when it is desired to mount the same on or remove the same from the flanges 20 and 21, and which is urged, for instance by a screw cooperating with a nut, against the flanges 20 and 21 in the radially inward direction of the ring 23 to urge the flanges 20 and 21 toward one another in the axial directions due to the inclinations of the faces of the flanges 20 and 21 which face away from one another and are engaged by the clamping arrangement 23, and thus to confine and squeeze the peripheral portion 22 of the diaphragm 17 between such flanges 20 and 21 to obtain the desired sealing effect.

The diaphragm 17 has a substantially central opening 24 through which there passes a portion 25 of an actuating rod 26. The diaphragm 17 is secured to the actuating rod 26 by means of two substantially disc-shaped mounting members 27 and 28 which confine the central region of the diaphragm 17 between themselves and are supported on the portion 25 of the actuating rod 26 with a minimum clearance from the latter, if any. The mounting members 27 and 28 are urged toward one another by means of a nut 29 which is threaded onto an externally threaded free end zone of the portion 25 of the actuating rod 26, and thus press the central region of the diaphragm 17 into sealing contact with themselves and with the portion 25 of the actuating rod 26 as well, thus eliminating any leakage through any interfaces between such elements. Hence, the diaphragm 17 sealingly separates the compartments 10 and 11 from one another. The mounting member 27 has a thickened central region 30 which gradually slopes toward merger with the remainder of the mounting member 27 but forms a plateau leftwardly spaced from such remainder and cooperating with the nut 29 substantially evenly and gradually to distribute the stresses induced in the mounting member 27 during the tightening of the nut 29.

The actuating rod 26 extends all the way through the gas-containing compartment 11, passing through the opening 15 of the partitioning wall 12 between the first and second zones 13 and 14 of such compartment 11 while still leaving between itself and the surface bounding the opening 15 an annular gap which has a sufficient size to allow for virtually unimpeded communication and gas flow between the zones 13 and 14. Moreover, the actuating rod 26 extends leftwardly beyond the accumulator zone 14 of the gas-containing compartment 11 to the exterior of the housing 2 through a self-lubricating sleeve-shaped bearing member 31 which is supported in an opening 32 of an end wall 33 of the housing 2.

A valve housing 34 is mounted on the end wall 33 of the housing 2 by means of threaded connecting members 35 which may be constructed as screws threaded into corresponding internally threaded bores of the housing 2 or, as shown, as nuts threaded onto externally threaded pins secured to the housing 2. The valve housing 34, which is advantageously made of aluminum, bounds an internal passage 36 which receives an extension portion 37 of the actuating rod 26, that is, that portion of the actuating rod 26 which extends leftwardly beyond the end wall 33 of the housing 2 in the respectively assumed position of the actuating rod 26.

The passage 26 includes two axially spaced radially outwardly enlarged regions 38 and 39 which receive respective sleeve-shaped inserts 40 and 41 which are substantially of the same construction and configuration and are advantageously made of steel, especially stainless steel. The insert 40 is held in position in the axial direction of the passage 36 by being confined between a bottom surface 42 of the enlarged portion or recess 38 and the external surface of the end wall 33 of the housing 2, while the insert 41 is similarly held in position in the axial direction by being confined between a bottom surface 43 of the enlarged portion or recess 39 and a lid 44 which is connected to the valve housing 34 by screws 45 or similar fasteners.

Each of the inserts 40 and 41 is so configurated as to be substantially fittingly or snugly received in the respective enlarged region 38 and 39 of the passage 36 of the valve housing 34 and to receive the extension portion 37 of the actuating rod 26 with minimum clearance. The interfaces between the inserts 40 and 41 and the valve housing 34 are sealed by respective annular seals 46, while the clearances between the respective inserts 40 and 41 and the extension portion 37 of the actuating rod 26 are sealed by respective sliding-type self-lubricating annular seals 47.

Each insert 40 and 41 bounds an annular channel 48 and a port 49 which opens into the annular channel 48 and onto the outer peripheral surface of the respective insert 40 or 41. While the inserts 40 and 41 are sufficiently held in position in the axial directions by the aforementioned confinement thereof and, in any event, small-scale axial displacement of any of these inserts 40 or 41 in either direction would not be detrimental to the operation of the pulsation damper 1, this is not true with respect to angular displacement of the annular inserts 40 and 41 about their respective central axes, that is, in the circumferential directions thereof. Yet, it is important if not crucial to keep the inserts 40 and 41 from performing such angular displacements, in order to keep the respective port 49 in substantial alignment with a respective bore 50 provided in the valve housing 34 at the region of the respective insert 40 or 41 and opening into the respective enlarged region 38 or 39 of the passage 36 and onto the external surface of the valve housing 34. To this end, the valve housing 34 and the respective annular insert 40 or 41 are provided with respective substantially cylindrical holes 51 and 52 which are aligned with one another in the illustrated positions of the inserts 40 and 41 in which the ports 49 are aligned with the bores 50, and respective retaining pins 53 are received in the holes 51 and 52 and extending across the interfaces between the respective insert 40 or 41 and the valve housing 34 to thereby restrain or at least limit the extent of movement of the respective insert 40 or 41 relative to the valve housing 26 in the circumferential direction. The respective retaining pin 53 is received in the respective hole 51 with an interference fit so as to be securely retained in place and also to substantially prevent leakage through the interface between the outer circumferential surface of the pin 53 and the surface bounding the hole 51, while the respective hole 52 may have a slightly larger diameter than the retaining pin 53, as shown, so that the latter is received in the hole 52 with a certain leeway facilitating the introduction of the retaining pin 53 into the hole 52 through the possibly less than perfectly aligned hole 51.

The bore 50 which is aligned with the port 49 of the insert 40 freely opens into the ambient atmosphere to form with the associated port 49 a discharge duct for discharging gaseous medium from the annular channel 48 of the insert 40. On the other hand, the bore 50 which is aligned with the port 49 of the insert 41 has an internally threaded free end portion into which there is threaded, during the use of the pulsation damper 1, an externally threaded free end portion 54 of a pressurized gaseous medium supply duct 55. The supply conduit 55 is connected, in a manner which has not been shown in the drawing, to a source of the pressurized gaseous medium, such as to a compressor or any other arrangement of a known construction. Thus, this bore 50 and the associated port 49 of the insert 41 together act as an admission duct for the pressurized gaseous medium into the annular channel 48 of the insert 41, in that the pressurized gaseous medium from the source is supplied through the supply conduit 55 into this admission duct.

The actuating rod 26 has an internal passage 56 which extends through the entire extension portion 37 all the way from the free end face of the extension portion 37 where it is sealingly closed by a plug 57 to a region 58 of the actuating rod 26 which is always situated within the gas-containing compartment 11 and particularly the accumulator zone 14 thereof, where transverse passages 59 communicate the same with the gas-containing compartment 11. The extension portion 37 has an annular recess 60 at its outer periphery, and additional transverse passages 61 communicatingly connect the internal passage 56 with the recess 60. The recess 60 is bounded by a substantially cylindrical bottom surface 62 and two sloping or inclined surfaces 63 and 64 which merge with the outer periphery of the remainder of the actuating rod 37 at respective control or throttling edges 65 and 66.

Having so described the construction of the pulsation damper 1 of the present invention, its operation will now be discussed with reference to FIGS. 1 to 3 of the drawing which show the pulsation damper 1 during three different stages of its operation.

FIG. 1 shows the pulsation damper 1 constructed in accordance with the present invention in its equilibrium condition which it assumes when the pressure in the gas-containing compartment 11 is equal to the pressure in the fluid-containing compartment 10, or substantially so. It may be seen that in this condition the movable wall 9 is situated substantially along the parting plane at which the housing parts 18 and 19 meet. This, in turn, means that the recess 60 of the extension portion 37 of the actuating rod 26 is fully received in a portion 67 of the passage 36 of the valve housing 34 which connects the enlarged regions 38 and 39 and has a diameter substantially corresponding to that of the remainder of the extension portion 37 of the actuating rod 26, so that the recess 60 of the actuating rod 26 is out of communication with both the annular channel 48 of the insert 40 and the annular channel 48 of the insert 41. This, of course, means that communication between the gas-containing compartment 11 and either one of the aforementioned discharge and admission ducts via the passages 59, 57 and 61 and the recess 60 is interrupted and, consequently, no gaseous medium can escape from, and no pressurized gaseous medium can enter, the gas-containing compartment 11. It may also be seen in FIG. 1 that, in this central position of the movable wall 9 (and of the actuating rod 26 and the recess 60 thereof), the recess 60 is spaced a predetermined distance from the annular channels 49 of the inserts 40 and 41, so that the actuating rod 26 has to perform a predetermined amount of travel either in the leftward or in the rightward direction before communication can be established between the recess 60 and either one of the channels 49. This provides for a certain amount of hysteresis in the operation of the pulsation damper 1, so that the amount of the gaseous medium contained in the gas-containing compartment 11 will not change with each and every displacement of the acutating rod 26, no matter how minute. Rather, the actuating rod 26 has to be significantly displaced out of its central position of FIG. 1 by a considerable imbalance between the axial forces acting on the movable wall 9 before the gaseous medium will be either discharged from, or admitted into, the gas-containing compartment 11.

Now, assuming initially that the pressure of the fluid admitted into the fluid-containing compartment 10 undergoes a significant decrease, it will be appreciated that the forces acting on the movable wall 9 in the leftward direction will outweigh those acting on the movable wall 9 in the rightward direction, so that the movable wall 9 will be caused by this pressure or force imbalance to move in the leftward direction from the position shown in FIG. 1 toward the position depicted in FIG. 2. Inasmuch as the actuating rod 26 moves with the movable wall 9, there will come a point during such leftward movement when the throttling edge 65 reaches the annular channel 48 of the insert 40, so that communication is established past this throttling edge 65 between the recess 60 and the channel 48 of the insert 40 and hence via the passages 59, 56 and 61 and the aforementioned discharge duct 49, 50 between the gas-containing compartment 11 and the ambient atmosphere. At first, this communication will be throttled by the throttling edge 65 and by the action of the sloping surface 63, but if the force imbalance is severe enough, the actuating rod 26 is displaced sufficiently toward or into the position of FIG. 2, so that the discharge of the gas is virtually unimpeded by the throttling edge 65. Conversely, during the return movement of the movable wall 9 and of the actuating rod 26 following discharge of a quantity of the gas from the gas-containing compartment 11 with attendant pressure reduction in the latter, the throttling action of the throttling edge 65 will become more pronounced with an increasing extent of displacement of the actuating rod 26 in the rightward direction, until the throttling edge 65 cuts off all communication between the recess 60 and the annular channel 48 of the insert 40. It will be appreciated that this throttling action of the throttling edge 65 prevents excessive and/or abrupt discharge of the gas from the gas-containing compartment 11, which would create problems, such as that of possible overshoot and attendant need for compensating for such overshoot, which could make the pulsation damper 1 unstable, or cause the latter to undergo oscillations before settling, with attendant adverse effects on the fluid contained in the fluid-containing compartment 10 and thus in the system whose pulsations are to be damped.

Conversely, when the pressure in the fluid-containing compartment 10 increases sufficiently above that prevailing in the gas-containing compartment 11, the movable wall 9 will be moved by this pressure differential in the rightward direction toward or all the way into the position illustrated in FIG. 3, the extent of such movement being again determined by the magnitude and abruptness of such pressure change. In this instance, it will be the throttling edge 66 and the associated sloping surface 64 which will become operative for controlling the flow between the annular channel 48 of the insert 41 and the recess 60 of the actuating rod 26. The throttling action is similar to that described before, except that this time it is the admission of the pressurized gaseous medium from the supply conduit 55 through the admission duct 49, 50 and the passages 61, 56 and 59 into the gas-containing compartment 11 that is being controlled. Here again, the throttling action of the throttling edge 66 prevents overreaction, so that the pressure in the gas-containing compartment 11 increases gradually, causing the movable wall 9 gradually to move back to the position of FIG. 1, until substantial equilibrium of the forces acting on the movable wall 9 in the opposite axial directions of the pulsation damper 1 is restored.

Thus, it may be seen that in each instance average pressure equilibrium between the compartments 10 and 11 is restored or established relatively quickly and yet without overshooting. On the other hand, short-duration pressure changes or pulsations are damped very effectively without changing the amount of the gaseous medium contained in the compartment 11 in that the movable wall 9 merely moves in the rightward or leftward direction, depending on whether the pressure of the fluid in the compartment 10 increases or decreases, within a range in which the throttling edges 65 and 66 do not yet permit communication between the recess 60 and the respective channel 48, this movement resulting either in an increase or a decrease in the pressure of the gaseous medium confined in the gas-containing compartment 11, depending on the direction of movement of the movable wall 9, so that the increased or decreased pressure of the gaseous medium in the compartment 11 counteracts or cancels the effect of the increased or decreased pressure of the fluid in the compartment 10 on the movable wall 9, until the movement of the movable wall in the rightward or leftward direction stops and substantial pressure equilibrium is established between the compartments 10 and 11.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulsation damper for damping pulsations in a fluid, comprising
    a housing centered on an axis, having two axially spaced ends and an inner surface which bounds an internal chamber and two substantially coaxial openings at the respective axially spaced ends of said housing;
    a movable wall extending across said internal chamber and sealingly subdividing the same into a fluid-containing compartment which has the fluid admitted thereinto through one of said openings during the use of the pulsation damper, and a gas-containing compartment that is in communication with the other of said openings, said wall being movable in either one of the axial directions out of a predetermined equilibrium position in response to pressure differential between said compartments;
    means for admitting a pressurized gaseous medium into a first region of said other opening which is remote from said gas-containing compartment;
    discharging means for communicating a second region of said other opening that is closer to said gas-containing compartment than said first region with the ambient atmosphere; and
    an actuating rod connected to said movable wall for joint movement therewith and having an extension portion which passes from said gas-containing compartment into said other opening and has an outer surface which forms respective interfaces with said inner surface in said other opening outside said regions, said actuating rod having internal conduit means which constantly communicates with said gas-containing compartment and opens onto a zone of said outer surface that is situated between and out of communication with either one of said admitting and discharging means in said equilibrium position of said movable wall and becomes at least partially aligned respectively with said admitting means and with said discharging means when excessive pressure in said fluid-containing compartment and in said gas-containing compartment respectively has moved said movable wall and said actuating rod out of said equilibrium position respectively toward and away from said other opening, respectively to increase and decrease the pressure of the gaseous medium in said gas-containing compartment to cause said movable wall to move toward said equilibrium position.

2. The pulsation damper as defined in claim 1, wherein said extension portion of said actuating rod has at said zone thereof an annular recess which opens onto said outer surface and communicates with said conduit means.

3. The pulsation damper as defined in claim 2, wherein said extension portion of said actuating rod has two surfaces which axially delimit said recess and are inclined away from respective radial planes of the actuating rod and from one another in the radially outward directions to delimit respective throttling gaps which terminate in throttling edges at the outer surface of the actuating rod.

4. The pulsation damper as defined in claim 2, wherein said housing has within said other opening and at said regions thereof respective annular channnels which open onto said inner surface and communicate with said admitting and discharging means, respectively.

5. The pulsation damper as defined in claim 4, wherein said housing includes a valve housing portion which surrounds said other opening and has an internal passage including a central section bounded by a part of said inner surface and two end sections situated at opposite axial sides of said central section and radially enlarged relative thereto, and two inserts each sealingly received in one of said end sections and forming another part of said inner surface of said other opening and the respective annular channel.

6. The pulsation damper as defined in claim 5, and further comprising sealing means at first interfaces between the respective inserts and said extension portion and at the second interfaces between said valve housing portion and the respective insert at both axial sides of the respective channel.

7. The pulsation damper as defined in claim 6, wherein said sealing means includes self-lubricating sliding-type annular seals at said first interfaces.

8. The pulsation damper as defined in claim 6, wherein said admitting and discharging means includes respective ports in said valve housing portion and in the respective inserts at the respective regions; and further comprising means for arresting said inserts in respective angular positions thereof with respect to the axis of said actuating rod in which the respective ports of said valve housing portion and of the respective insert are aligned with one another.

9. The pulsation damper as defined in claim 7, wherein said arresting means includes respective retaining pins which are received in respective substantially radial bores of and extend across the respective interfaces between the valve housing portion and the respective insert.

10. The pulsation damper as defined in claim 5, wherein said recess of said extension portion and said channels of said inserts are so axially dimensioned and positioned with respect to one another that said recess is out of communication with either one of said channels in said equilibrium position and until said movable wall and said actuating rod have been displaced out of said equilibrium position in one or the other of the axial directions by a predetermined distance.

* * * * *